US012233971B2

(12) United States Patent
Oshima et al.

(10) Patent No.: US 12,233,971 B2
(45) Date of Patent: Feb. 25, 2025

(54) VEHICLE DRIVING SUPPORT APPARATUS

(71) Applicant: SUBARU CORPORATION, Tokyo (JP)

(72) Inventors: Kensuke Oshima, Tokyo (JP); Makoto Nakauchi, Tokyo (JP); Masaya Sakamoto, Tokyo (JP); Yuki Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 213 days.

(21) Appl. No.: 18/175,847

(22) Filed: Feb. 28, 2023

(65) Prior Publication Data
US 2023/0294760 A1 Sep. 21, 2023

(30) Foreign Application Priority Data

Mar. 16, 2022 (JP) .................. 2022-041781

(51) Int. Cl.
B62D 6/00 (2006.01)
B62D 7/15 (2006.01)
(52) U.S. Cl.
CPC ............. B62D 6/003 (2013.01); B62D 7/159 (2013.01)
(58) Field of Classification Search
CPC .................. B62D 6/003; B62D 7/159
See application file for complete search history.

(56) References Cited

U.S. PATENT DOCUMENTS

2020/0394907 A1* 12/2020 Takamori .............. B60W 30/02
2023/0391324 A1* 12/2023 Zarringhalam ....... B60W 30/12

FOREIGN PATENT DOCUMENTS

JP 2018-154304 A 10/2018

* cited by examiner

Primary Examiner — Jacob M Amick
(74) Attorney, Agent, or Firm — Rimon P.C.

(57) ABSTRACT

A vehicle driving support apparatus to be applied to a vehicle comprises a running environment recognizer; a preceding vehicle information acquirer that detects a vehicle class and variation in behavior of a preceding vehicle; an amount-of-steering control calculator that calculates an amount of steering control to cause the vehicle to run along a target path of travel set on a lane; a disturbance estimation control calculator that estimates lateral-direction disturbance to calculate an amount of steering against the disturbance based on the estimated disturbance; and a coordination controller that corrects the amount of steering control with the amount of steering. If a rolling direction and a lateral motion direction of the preceding vehicle coincide with each other, the disturbance estimation control calculator determines that the variation in the behavior of the preceding vehicle is caused by the disturbance, and calculates the amount of steering.

13 Claims, 13 Drawing Sheets

COUNTERCLOCKWISE TURNING

EXTERNAL FORCE
(CROSSWIND)

VEHICLE DRIVING SUPPORT APPARATUS

CROSS-REFERENCE TO RELATED APPLICATIONS

The present application claims priority from Japanese Patent Application No. 2022-041781 filed on Mar. 16, 2022, the entire contents of which are hereby incorporated by reference.

BACKGROUND

The disclosure relates to a vehicle driving support apparatus to be applied to a vehicle. The vehicle driving support apparatus checks a rolling direction and a lateral motion direction of a preceding vehicle from variation in the behavior of the preceding vehicle and, if the rolling direction coincides with the lateral motion direction, estimates that the preceding vehicle receives disturbance from a lateral direction.

Various vehicle driving support apparatuses that reduces the burdens on drivers to enable comfortable and safe driving have hitherto been supposed. The driving support of such a type enables automatic driving of a vehicle along a driving lane while keeping a distance between the vehicle and a preceding vehicle using an adaptive cruise control (ACC) function and an active lane keep bouncing (ALKB) control function with a lane departure prevention function.

If a vehicle receives crosswind during automatic driving, the vehicle rolls and is likely to laterally move to the leeward direction. In the ALKB control, if a shift in the lateral position with respect to a driving lane of the vehicle is detected, the amount of the lateral shift is corrected or variation in the behavior of the vehicle is detected from a yaw rate, a yaw angle, or the like to perform correction through feedback control.

In this case, since control to correct the variation in the behavior is performed after the vehicle receives the crosswind and the variation in the behavior is detected, there is room for improvement in that the lateral shift occurs due to control delay. In order to resolve the problem, for example, Japanese Unexamined Patent Application Publication (JP-A) No. 2018-154304 discloses a technology to estimate the degree of the crosswind occurring in front of a vehicle from variation in the behavior of another vehicle, such as a preceding vehicle running in front of the vehicle, an oncoming vehicle running on the opposite lane, or the like to predict disturbance to be applied to the vehicle from the estimated degree of the crosswind.

SUMMARY

An aspect of the disclosure provides a vehicle driving support apparatus to be applied to a vehicle. The vehicle driving support apparatus comprises a running environment recognizer, a preceding vehicle information acquirer, an amount-of-steering control calculator, a disturbance estimation control calculator, and a coordination controller. The running environment recognizer is configured to recognize running environment in front of the vehicle. The preceding vehicle information acquirer is configured to acquire information about a preceding vehicle based on the running environment recognized by the running environment recognizer to detect, from the acquired information about the preceding vehicle, a vehicle class of the preceding vehicle and variation in behavior of the preceding vehicle. The amount-of-steering control calculator is configured to calculate an amount of steering control to cause the vehicle to run along a target path of travel set on a lane. The disturbance estimation control calculator is configured to estimate, based on the vehicle class and the variation in the behavior, lateral-direction disturbance received by the preceding vehicle to calculate an amount of steering against the disturbance based on the estimated disturbance. The coordination controller is configured to correct the amount of steering control calculated by the amount-of-steering control calculator with the amount of steering calculated by the disturbance estimation control calculator to set a new amount of steering control. The disturbance estimation control calculator is configured to check a rolling direction and a lateral motion direction of the preceding vehicle from the variation in the behavior of the preceding vehicle. The disturbance estimation control calculator is configured to, in a case where the rolling direction coincides with the lateral motion direction, determine that the variation in the behavior of the preceding vehicle is caused by the disturbance if the rolling direction coincides with the lateral motion direction, and calculate the amount of steering.

An aspect of the disclosure provides a vehicle driving support apparatus to be applied to a vehicle comprising circuitry. The circuitry is configured to recognize running environment in front of the vehicle. The circuitry is configured to acquire information about a preceding vehicle based on the recognized running environment to detect, from the acquired information about the preceding vehicle, a vehicle class of the preceding vehicle and variation in behavior of the preceding vehicle. The circuitry is configured to calculate an amount of steering control to cause the vehicle to run along a target path of travel set on a lane. The circuitry is configured to estimate, based on the vehicle class and the variation in the behavior, lateral-direction disturbance received by the preceding vehicle to calculate an amount of steering against the disturbance based on the estimated disturbance. The circuitry is configured to correct the calculated amount of steering control with the calculated amount of steering to set a new amount of steering control. The circuitry is configured to check a rolling direction and a lateral motion direction of the preceding vehicle from the variation in the behavior of the preceding vehicle. The circuitry is configured to, in a case where the rolling direction coincides with the lateral motion direction, determine that the variation in the behavior of the preceding vehicle is caused by the disturbance, and calculate the amount of steering.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Since the degree of crosswind is estimated from a lateral motion of a preceding vehicle in the technology disclosed in JP-A No. 2018-154304, it is difficult to determine whether the lateral motion is caused by disturbance, such as the crosswind, or a voluntary operation by a driver who drives a vehicle.

As a result, if the disturbance to be applied to the vehicle is predicted based on the lateral motion of the preceding vehicle, which is caused by a voluntary operation of the steering wheel by the driver, the vehicle may roll.

It is desirable to provide a vehicle driving support apparatus that is to be applied to a vehicle and that, in estimation of lateral-direction disturbance received by the vehicle from variation in the behavior of a preceding vehicle, is capable of determining whether the variation in the behavior of the preceding vehicle is caused by disturbance or a voluntary operation of the steering wheel by the driver to effectively suppress the roll occurring on the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
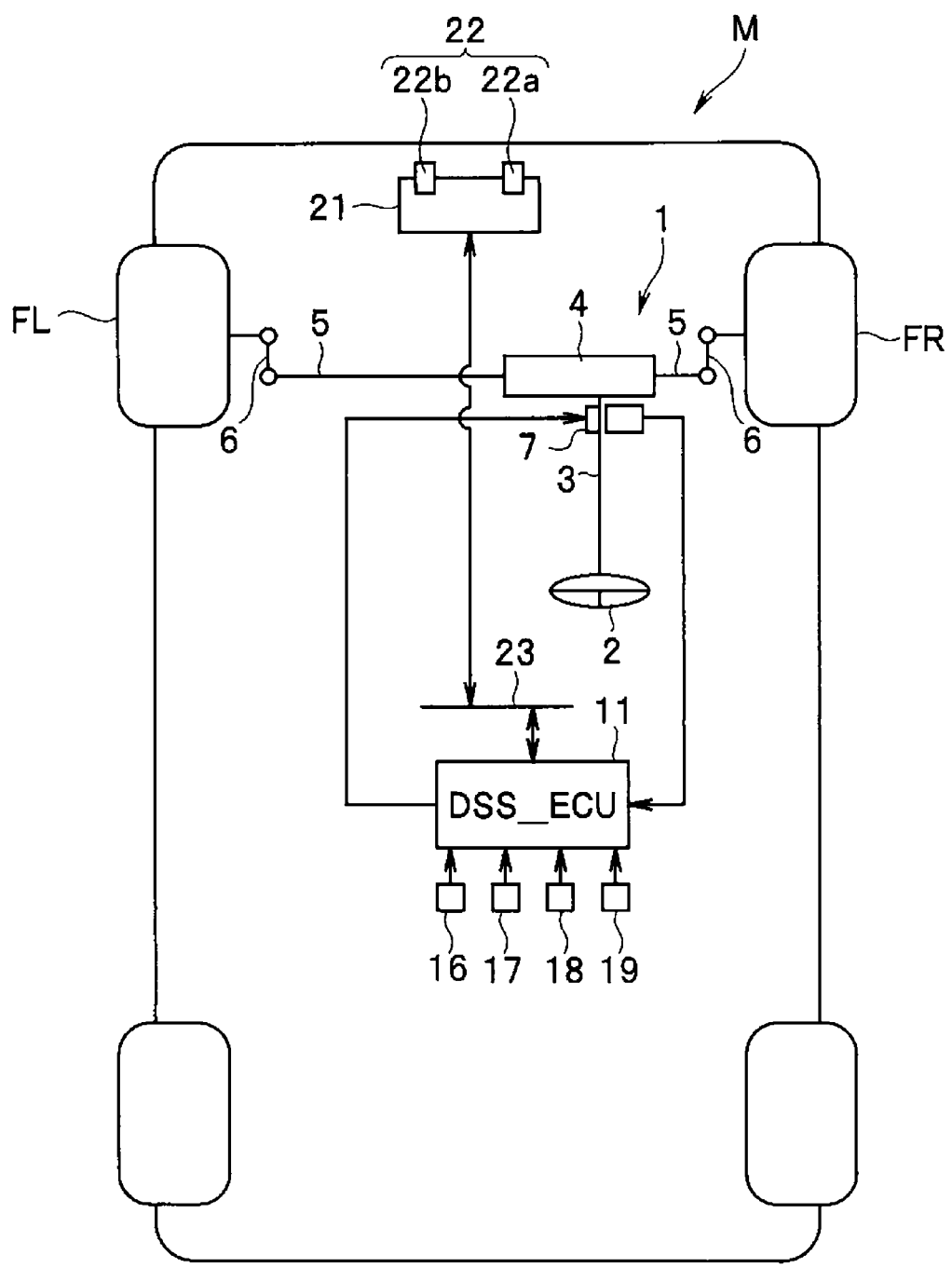
FIG. 1 is a diagram schematically illustrating the entire configuration of a vehicle driving support apparatus to be applied to a vehicle.

FIG. 1 is a diagram schematically illustrating the entire configuration of a vehicle driving support apparatus to be applied to a vehicle M. Referring to FIG. 1, in the vehicle M, left and right front wheels FL and FR are wheels for steering and the front wheels or the four wheels may be used as driving wheels. Although the steering direction and the yaw rate of the left front wheel FL have different signs from those of the right front wheel FR, the steering directions and the yaw rates of the left and right front wheels FL and FR are indicated by absolute values for convenience.

Referring to FIG. 1, reference numeral 1 denotes a steering system. A pinion shaft (not illustrated) is provided at the tip of a steering shaft 3 having a steering wheel 2 fixed at the base end side and the pinion shaft is connected to a steering mechanism 4, such as a rack-and-pinion mechanism. The steering mechanism 4 is connected to the left and right front wheels FL and FR via the corresponding tie rods 5 and the corresponding front knuckles 6. In response to an operation of the steering wheel 2 by a driver who drives the vehicle M, the left and right front wheels FL and FR are turned via the steering mechanism 4. In addition, an electronic power steering (EPS) motor 7, which serves as a steering driver, is connected to the steering shaft 3.

The EPS motor 7 is steered and controlled in response to a driving signal from a driving support control unit (driving support system electronic control unit (DSS_ECU) 11, which serves as a steering support controller. A vehicle speed sensor 16, an acceleration sensor 17, a yaw rate sensor 18, a roll angle sensor 19, and so on are connected to the input side of the DSS_ECU 11. The vehicle speed sensor 16 detects a vehicle speed of the vehicle M. The acceleration sensor 17 detects acceleration in the front and back direction applied to the vehicle M. The yaw rate sensor 18 detects a yaw rate applied to the vehicle M. The roll angle sensor 19 detects a roll angle of the vehicle M. The vehicle speed, the acceleration in the front and back direction, the yaw rate, and the roll angle are included in various parameters used in behavior control through automatic steering.

In addition, a front recognition unit 21 is provided in the foreside in the vehicle interior of the vehicle M. The front recognition unit 21 includes a stereo camera 22 composed of a main camera 22a and a sub-camera 22b. An analog image of the surrounding environment in front of the vehicle M, which is captured and acquired by each of the main camera 22a and the sub-camera 22b, is subjected to certain image processing and the image subjected the image processing is transmitted as front running environment information. In one embodiment, the front recognition unit 21 may serve as a "running environment recognizer".

The front recognition unit 21 is connected to the DSS_ECU 11 so as to be capable of two-way communication via an in-vehicle communication line 23, such as a controller area network (CAN). Each of the front recognition unit 21 and the DSS_ECU 11 is composed a microcontroller including a central processing unit (CPU), a random access memory (RAM), a read only memory (ROM), a rewritable non-volatile memory (a flash memory or an electrically erasable programmable read only memory (EEPROM)), and peripheral devices. Programs, fixed data, and so on used by the CPU to perform various processes are stored in the ROM. The RAM is provided as a working area of the CPU and a variety of data in the CPU is temporarily stored in the RAM. The CPU is also called a microprocessor (MPU). A graphics processing unit (GPU) or a graph streaming processor (GSP) may be used, instead of the CPU. Alternatively, the CPU, the GPU, and the GSP may be selectively combined.

Figure 12A:
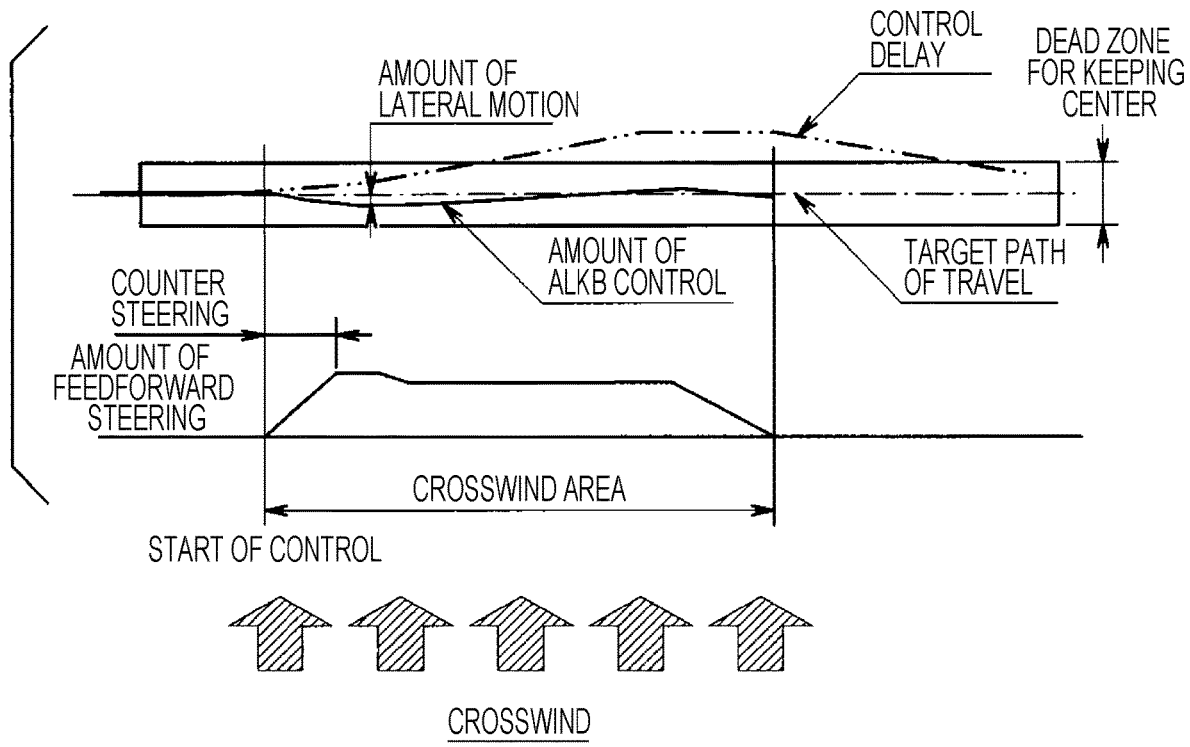
FIG. 12A is a diagram for describing a state in which an amount of ALKB control is corrected with the amount of feedforward steering that is set based on the estimated wind speed value.

In the DSS_ECU 11, for example, the active lane keep bouncing (ALKB) control with the lane departure prevention function through steering support is performed. In the ALKB control, first, division lines for dividing a driving lane into the left lane and the right lane are recognized based on the front running environment information from the front recognition unit 21 to determine the center between the division lines (the center of the lane). Then, the center of the lane is set as a target path of travel and dead zones for keeping the center are set on the left and right sides of the target path of travel (refer to FIG. 12A). Then, the steering control is performed so that the vehicle M runs along the target path of travel.

In addition, in the DSS_ECU 11, variation in a roll behavior due to the crosswind is monitored from variation in the behavior of a vehicle running in front of the vehicle M, such as a preceding vehicle, based on the front running environment information from the front recognition unit 21, a crosswind speed and a crosswind area as a disturbance area are estimated from the variation in the roll behavior, and the steering support when the vehicle M enters the crosswind area is performed.

Figure 2:
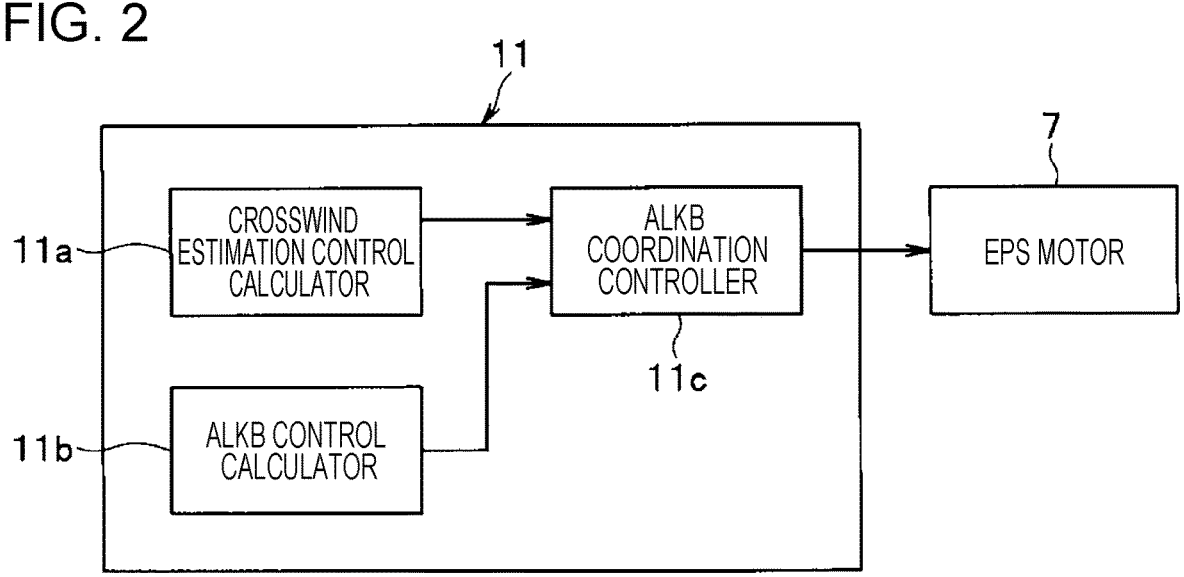
FIG. 2 is a functional block diagram of a driving support control unit.

FIG. 2 is a functional block diagram of the DSS_ECU 11. Referring to in FIG. 2, a crosswind estimation control calculator 11a, an ALKB control calculator 11b, and an ALKB coordination controller 11c are provided in the DSS_ECU 11 as steering support control functions against the crosswind. In one embodiment, the crosswind estimation control calculator 11a may serve as a "disturbance estimation control calculator", and an ALKB control calculator 11b may serve as an "amount-of-steering control calculator".

Figure 14:
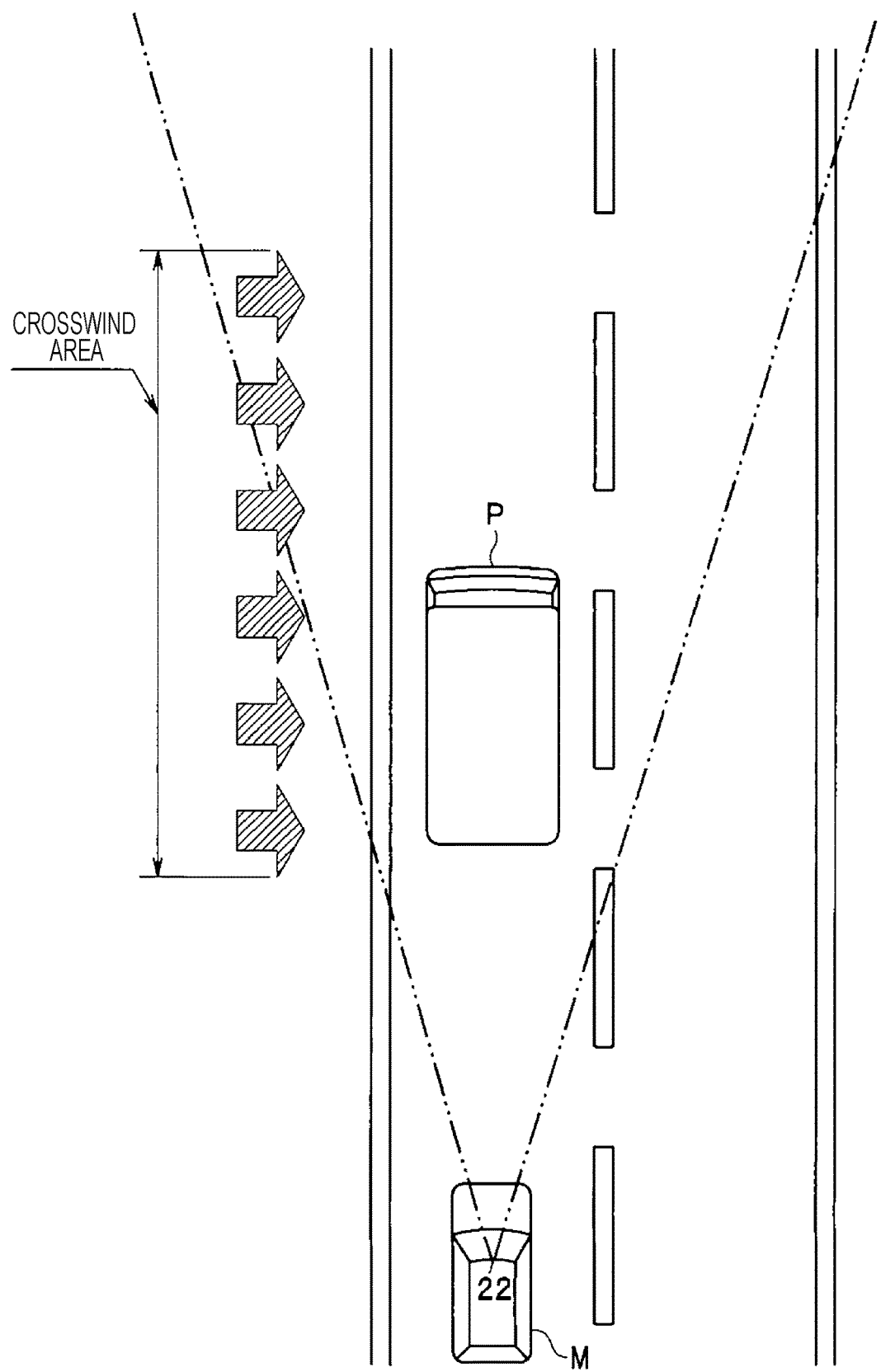
FIG. 14 is a plane view illustrating a state in which the preceding vehicle is passing the crosswind area.

If the crosswind estimation control calculator 11a recognizes a preceding vehicle P (refer to FIG. 14) based on the front running environment information recognized by the front recognition unit 21, the crosswind estimation control calculator 11a determines whether the preceding vehicle P is influenced by the crosswind based on the variation in the behavior of the preceding vehicle P and, if the crosswind estimation control calculator 11a determines that the preceding vehicle P is influenced by the crosswind, estimates the wind speed of the crosswind and the crosswind area from the variation in the roll behavior of the preceding vehicle P. Then, the crosswind estimation control calculator 11a calculates an amount of feedforward steering, which is an amount of crosswind handling steering, to correct an amount of lateral shift caused by the crosswind.

The ALKB control calculator 11b sets the target path of travel at the center of the left and right division lines based on the front running environment information recognized by the front recognition unit 21 to set an amount of ALKB control, which is an amount of steering control for causing the vehicle M to run along the target path of travel. In addition, the ALKB control calculator 11b calculates an amount of steering (an amount of feedback steering) to correct a shift in the lateral position from the shift in the lateral position to correct the amount to ALKB control (feedback control). The shift in the lateral position occurs during the running of the vehicle M and is the difference between the target path of travel and the amount of ALKB control.

The ALKB coordination controller 11c corrects the amount of ALKB control based on the amount of feedforward steering set in the crosswind estimation control calculator 11a and the amount of feedback steering set in the ALKB control calculator 11b to set a new amount of ALKB control. As a result, the amount of ALKB control is corrected by the amount of lateral shift received by the vehicle M when the vehicle M goes through the crosswind area and the amount of feedback steering is relatively decreased to suppress the rolling when the vehicle M is caused to run along the target path of travel.

Figure 3:
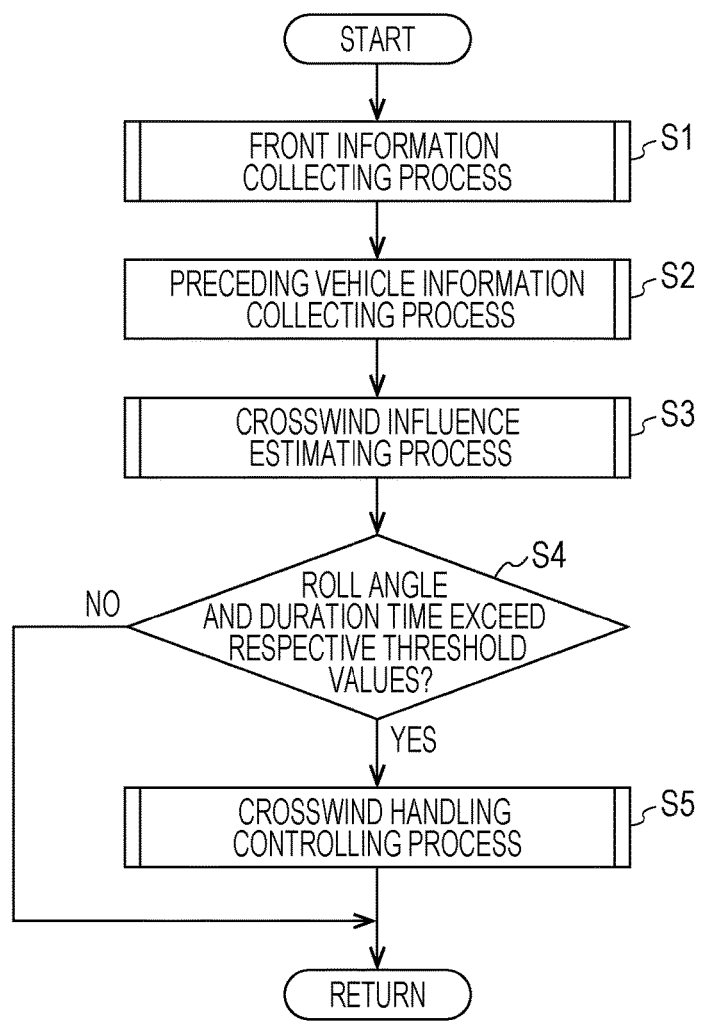
FIG. 3 is a flowchart illustrating a crosswind handling steering control routine.

Crosswind handling steering control in the crosswind estimation control calculator 11a is performed in accordance with a crosswind handling steering control routine illustrated in FIG. 3. Referring to FIG. 3, in Step S1, the crosswind estimation control calculator 11a performs a front information collecting process. The front information collecting process is performed in accordance with a front information collecting process subroutine illustrated in FIG. 4.

<Front Information Collecting Process>

Figure 4:
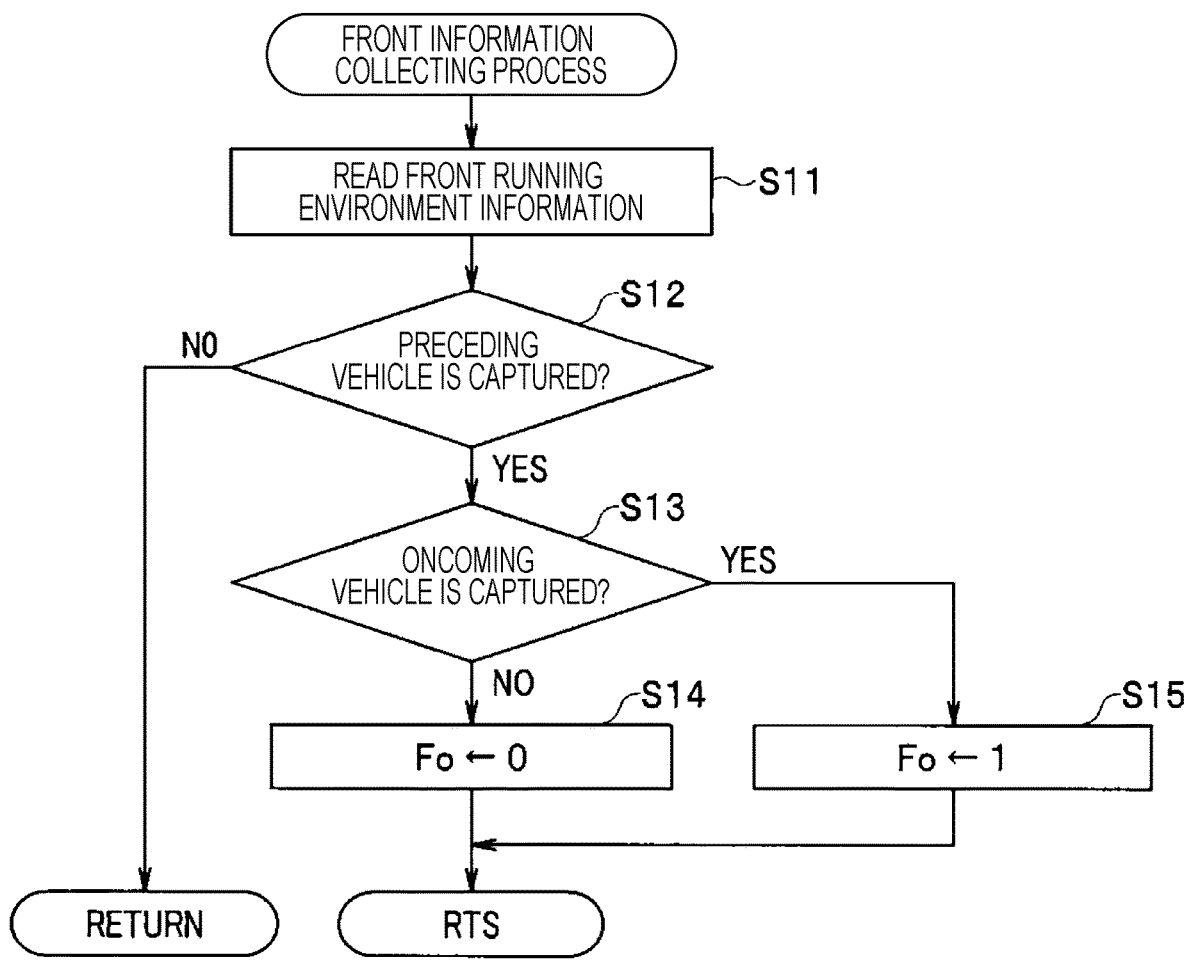
FIG. 4 is a flowchart illustrating a front information collecting process subroutine.

Referring to FIG. 4, in the front information collecting process subroutine, in Step S11, the crosswind estimation control calculator 11a reads the front running environment information recognized by the front recognition unit 21. In Step S12, the crosswind estimation control calculator 11a determines whether the preceding vehicle P is captured in a certain area in front of the vehicle M based on the front running environment information. If the crosswind estimation control calculator 11a determines that the preceding vehicle P is captured (YES in Step S12), the subroutine goes to Step S13. If the crosswind estimation control calculator 11a determines that the preceding vehicle P is not captured (NO in Step S12), the subroutine illustrated in FIG. 4 is terminated.

Figure 15:
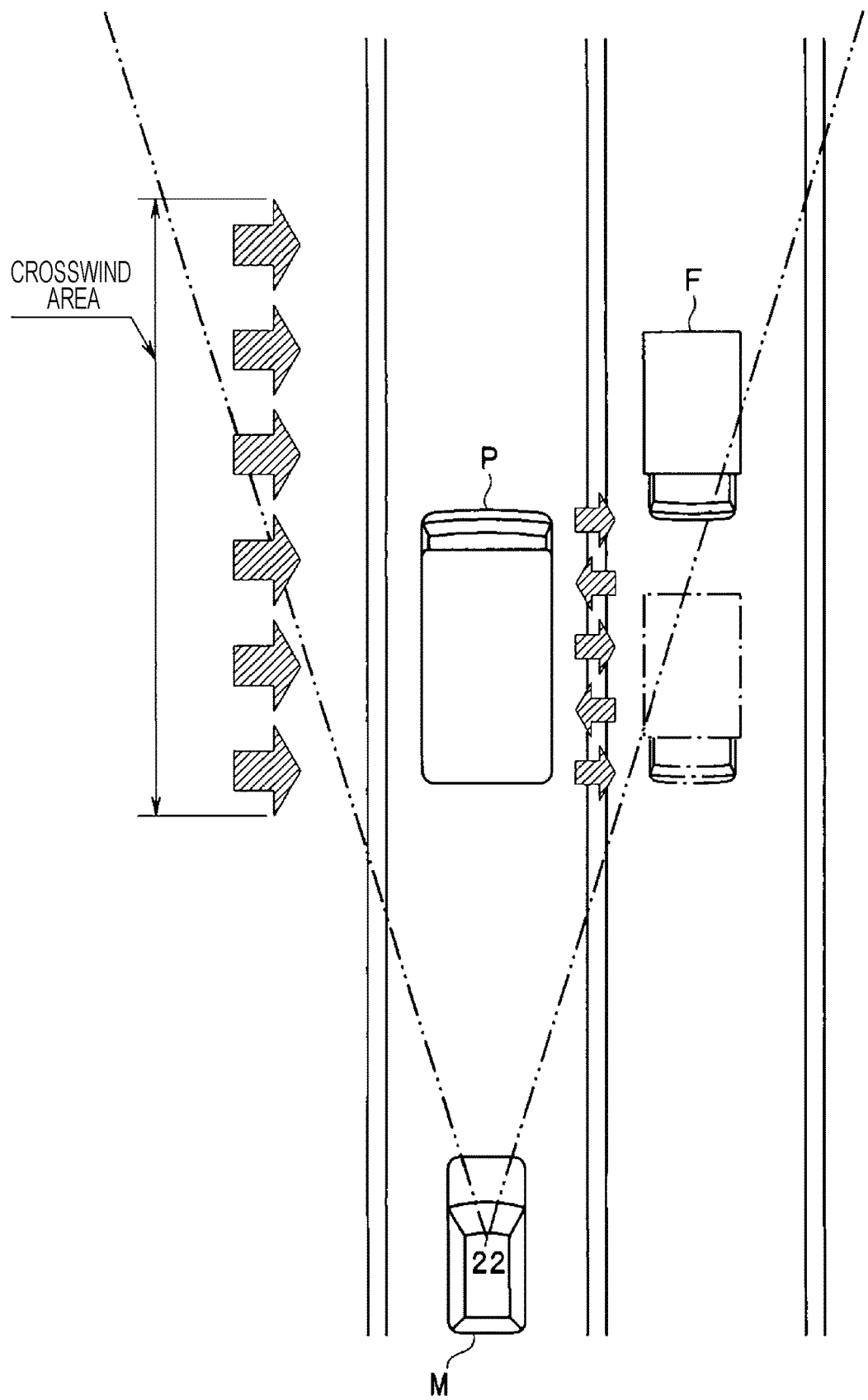
FIG. 15 is a plane view illustrating a state in which an oncoming vehicle is passing the preceding vehicle in the crosswind area.

In Step S13, the crosswind estimation control calculator 11a determines whether an oncoming vehicle F (refer to FIG. 15) that is passing the preceding vehicle P is captured in the adjacent opposite lane based on the front running environment information. If the crosswind estimation control calculator 11a determines that the oncoming vehicle F is not captured (NO in Step S13), the subroutine goes to Step S14. If the crosswind estimation control calculator 11a determines that the oncoming vehicle F is captured (YES in Step S13), the subroutine goes to Step S15.

In Step S14, the crosswind estimation control calculator 11a clears an oncoming vehicle flag Fo (Fo←0). Then, the subroutine goes to Step S2 in FIG. 3. In Step S15, the crosswind estimation control calculator 11a sets the oncoming vehicle flag Fo (Fo←1). Then, the subroutine goes to Step S2 in FIG. 3.

<Preceding Vehicle Information Collecting Process>

In Step S2 in FIG. 3, the crosswind estimation control calculator 11a performs a preceding vehicle information collecting process. Then, the routine goes to Step S3.

Figure 5:
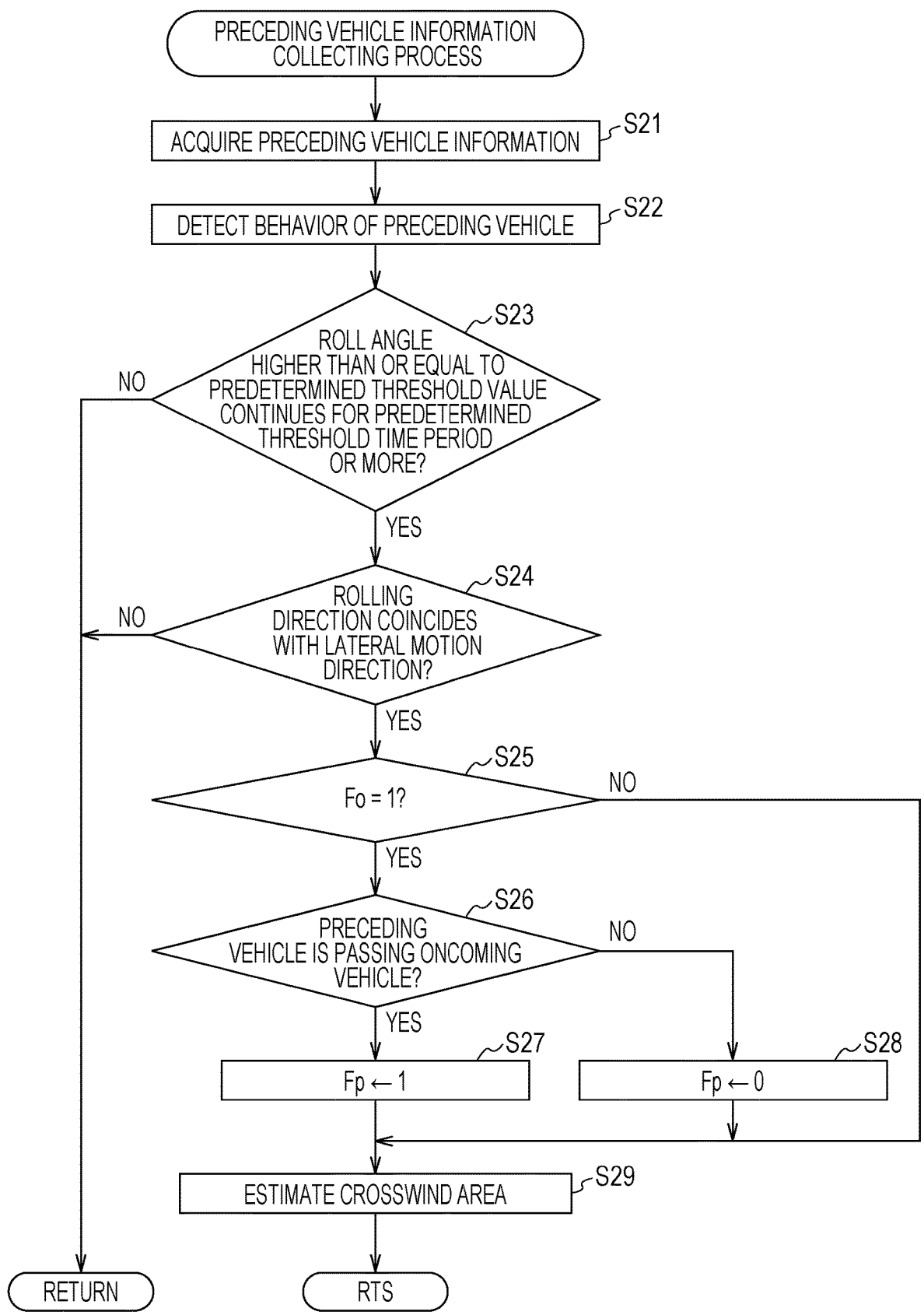
FIG. 5 is a flowchart illustrating a preceding vehicle information collecting process subroutine.
Figure 13:
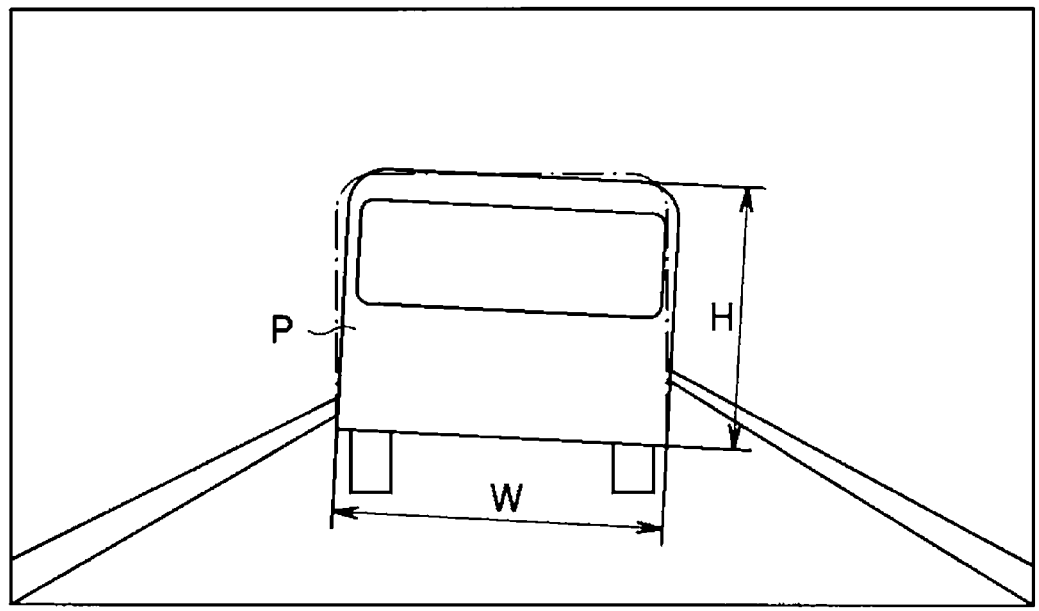
FIG. 13 is a diagram for describing rolling of a preceding vehicle, which is shoot by a camera unit.

The preceding vehicle information collecting process is performed in accordance with a preceding vehicle information collecting process subroutine illustrated in FIG. 5. Referring to FIG. 5, in Step S21, the crosswind estimation control calculator 11a acquires information about the preceding vehicle P from the front running environment information recognized by the front recognition unit 21. The information about the preceding vehicle P includes a vehicle class, a distance between the vehicle M and the preceding vehicle P, a vehicle speed calculated from a relative vehicle speed with respect to the vehicle M, and so on. The vehicle class indicates a height H from the ground of a vehicle body and a width W, which is calculated by surrounding the edges of the rear face of the preceding vehicle by a rectangular frame (refer to FIG. 9A, FIG. 9B, and FIG. 13).

Figure 10:
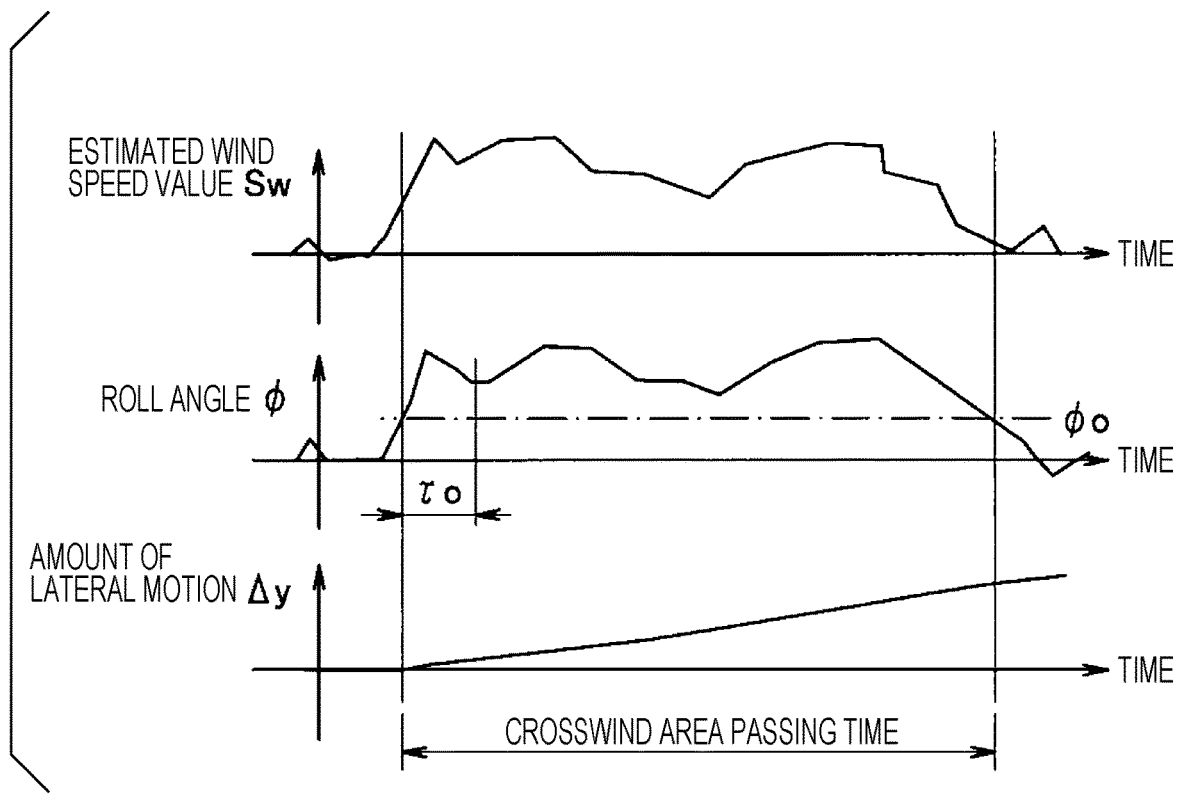
FIG. 10 is a time chart illustrating a mode in which an estimated wind speed value of the crosswind is calculated from a roll angle and an amount of lateral motion of the preceding vehicle.

In Step S22, the crosswind estimation control calculator 11a monitors the variation in the behavior of the preceding vehicle P to check a roll angle ϕ of the preceding vehicle P and the moving direction of the vehicle body due to the rolling. In Step S23, the crosswind estimation control calculator 11a determines whether the roll angle ϕ of a value higher than or equal to a predetermined threshold value ϕo continues for a predetermined threshold time period τo or more (refer to FIG. 10). Step S21 and Step S22 correspond to a preceding vehicle information acquirer of the disclosure.

If the crosswind estimation control calculator 11a determines that the roll angle ϕ of a value higher than or equal to the predetermined threshold value ϕo continues for the predetermined threshold time period TO or more (YES in Step S23), the subroutine goes to Step S24. If the roll angle ϕ has a value lower than the predetermined threshold value ϕo or if the duration time of the roll angle ϕ is shorter than the predetermined threshold time period TO even when the roll angle ϕ has a value higher than or equal to the predetermined threshold value ϕo, the subroutine in FIG. 5 is terminated.

Figure 9A:
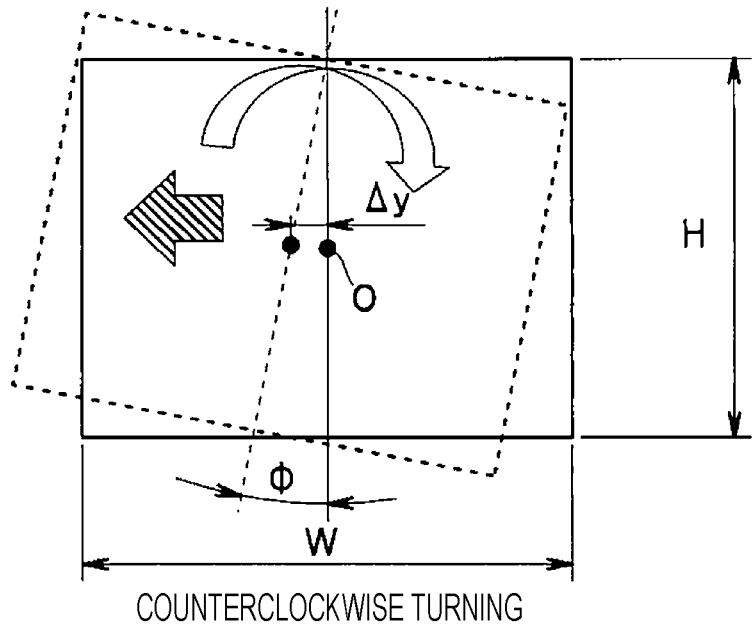
FIG. 9A is a diagram for describing variation in a roll behavior during turning.
Figure 9B:
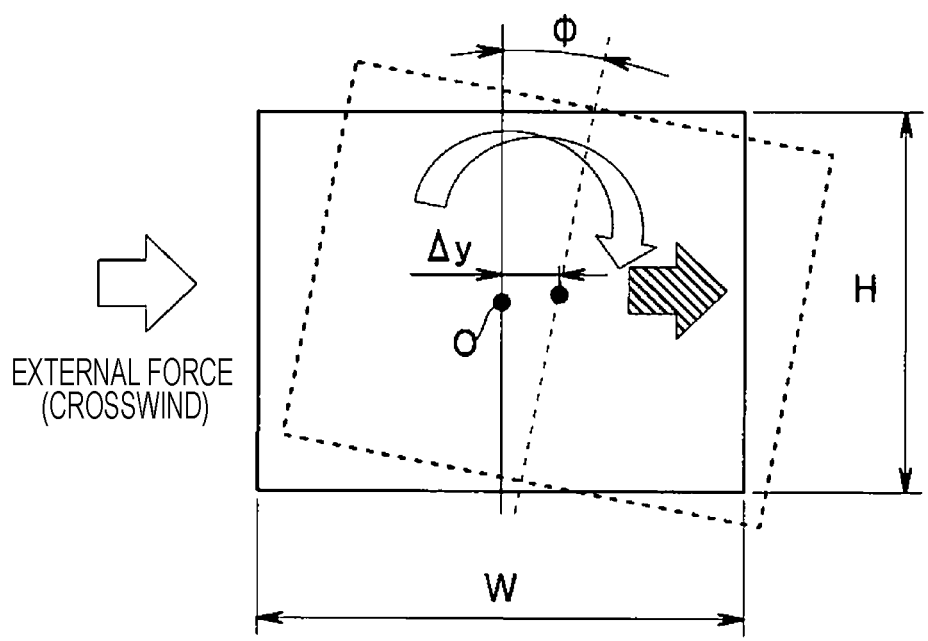
FIG. 9B is a diagram for describing the variation in the roll behavior when a preceding vehicle is influenced by crosswind during running.

In Step S24, the crosswind estimation control calculator 11a checks a lateral motion direction from the variation in the behavior of the preceding vehicle P. In other words, the lateral motion direction with respect to a rolling direction exerted on the vehicle body when the preceding vehicle P is running on a curved road is different from that when the preceding vehicle P receives the disturbance, such as the crosswind, on a straight road. For example, as illustrated in FIG. 9A, when the preceding vehicle P is running on a left-hand curve, the preceding vehicle P rolls in the clockwise direction indicated by an open arrow while the lateral motion is applied in the opposite direction, as indicated by a hatched arrow. In contrast, as illustrated in FIG. 9B, if the disturbance, such as the crosswind, is applied to a side surface (the left-side surface) when the preceding vehicle P is running on a straight road, the rolling indicated by the open arrow is applied in the same direction as that of the lateral motion indicated by the hatched arrow. Referring to FIG. 9A and FIG. 9B, reference letter O denotes the center of the frame surrounding the rear face of the preceding vehicle P and Δy denotes an amount-of-lateral-motion.

If the rolling direction of the preceding vehicle P coincides with the lateral motion direction (YES in Step S24), the crosswind estimation control calculator 11a determines that the preceding vehicle P is receiving the influence of the crosswind. Then, the subroutine goes to Step S25. If the rolling direction of the preceding vehicle P does not coincide with the lateral motion direction (NO in Step S24), the crosswind estimation control calculator 11a determines that the preceding vehicle P is laterally moving in response to an operation of the steering wheel, for example, the preceding vehicle P is running of a curved road. Then, the subroutine illustrated in FIG. 5 is terminated.

In Step S25, the crosswind estimation control calculator 11a refers to the value of the oncoming vehicle flag Fo. The oncoming vehicle flag Fo is set when the oncoming vehicle F that is passing the preceding vehicle P is detected and is cleared when the oncoming vehicle F that is passing the preceding vehicle P is not detected. If Fo=1 (YES in Step S25), the subroutine goes to Step S26. If Fo=0 (NO in Step S25), the subroutine goes to Step S29.

In Step S26, the crosswind estimation control calculator 11a determines whether the preceding vehicle P is passing the oncoming vehicle F. The determination of whether the preceding vehicle P is passing the oncoming vehicle F is based on the front running environment information recognized by the front recognition unit 21 and the relative distances between the vehicle M, and the preceding vehicle P and the oncoming vehicle F. If the preceding vehicle P is passing the oncoming vehicle F (YES in Step S26), in Step S27, the crosswind estimation control calculator 11a sets a passing flag Fp (Fp←1). Then, the subroutine goes to Step S29. If the preceding vehicle P is not passing the oncoming vehicle F (NO in Step S26), in Step S28, the crosswind estimation control calculator 11a clears the passing flag Fp (Fp←0). Then, the subroutine goes to Step S29.

In Step S29 after Step S25, Step S27, or Step S28, the crosswind estimation control calculator 11a estimates the crosswind area. Then, the subroutine goes to Step S3 in FIG. 3.

The crosswind area (refer to FIG. 14 and FIG. 15) is estimated based on a crosswind area passing time (refer to FIG. 10) that is measured and the vehicle speed of the preceding vehicle P. The crosswind area passing time is the time during which a state in which the roll angle ϕ of the preceding vehicle P has a value higher than or equal to the predetermined threshold value continues.

In Step S3 in FIG. 3, the crosswind estimation control calculator 11a performs a process to estimate the influence of the crosswind on the vehicle M. The process to estimate the influence of the crosswind on the vehicle M is performed in accordance with a crosswind influence estimating process subroutine illustrated in FIG. 6.

Figure 6:
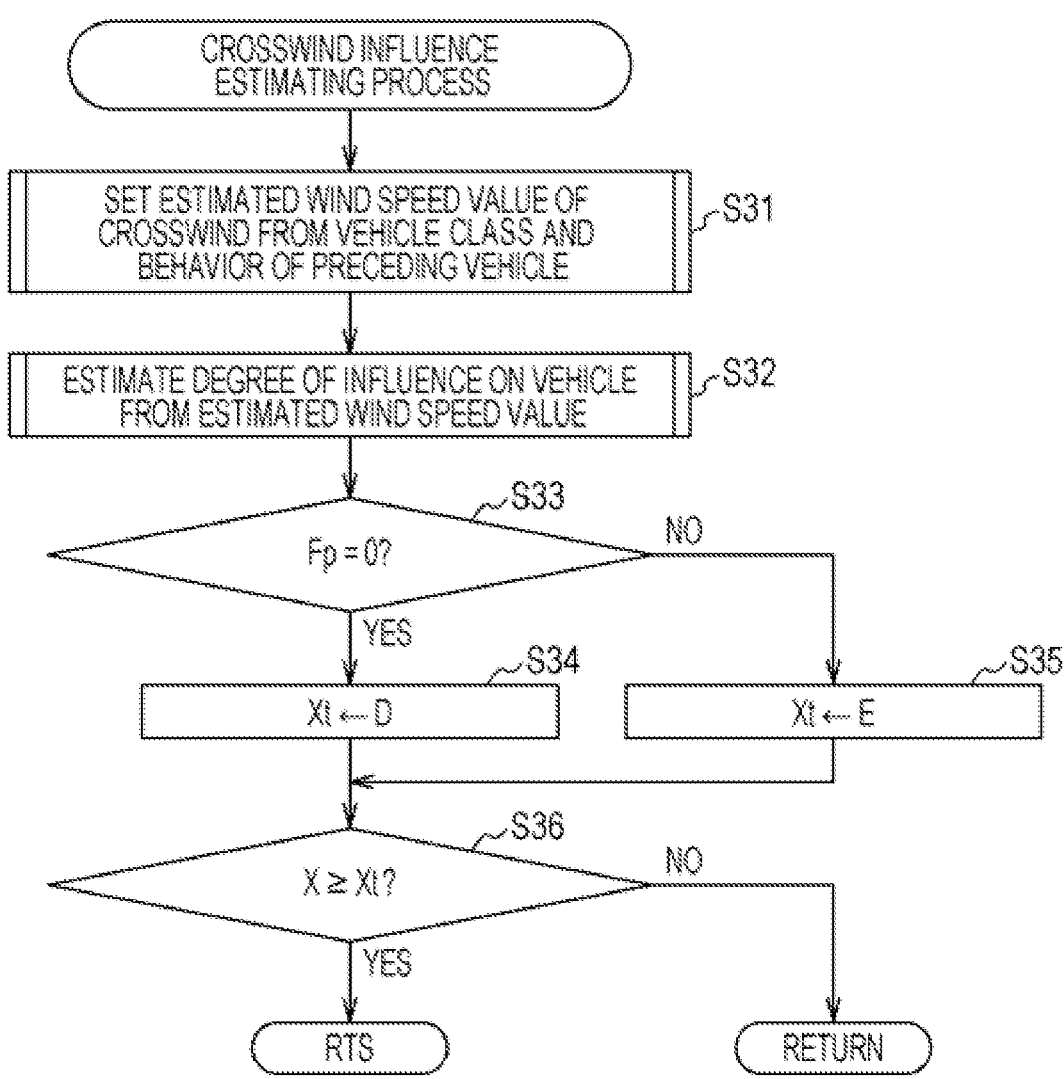
FIG. 6 is a flowchart illustrating a crosswind influence estimating process subroutine.

Referring to FIG. 6, in the crosswind influence estimating process subroutine, in Step S31, the crosswind estimation control calculator 11a sets an estimated wind speed value Sw of the crosswind, which is received as the disturbance in the crosswind area. The estimated wind speed value Sw of the crosswind is calculated from the vehicle class (the height H and the width W) and the variation in the behavior (the roll angle ϕ and the amount-of-lateral-motion Δy) of the preceding vehicle P, which are calculated based on the front running environment information recognized by the front recognition unit 21. The height H is greatly influenced by the crosswind received by the preceding vehicle P. When the height H of the preceding vehicle P is high, the roll angle and the variation in the behavior, such as the amount of lateral motion, which are caused by the crosswind, are increased, compared with those of a low vehicle, such as a car. Accordingly, a map that is stored in advance based on the vehicle class and the variation in the behavior is searched to set the estimated wind speed value Sw.

In Step S32, the crosswind estimation control calculator 11a estimates a degree-of-influence X of the estimated wind speed value Sw on the vehicle class of the vehicle M. The degree-of-influence X is the amount of motion considering the roll angle of the vehicle M and is set based on the estimated wind speed value Sw and the vehicle class of the vehicle M with reference to the predetermined map.

In Step S33, the crosswind estimation control calculator 11a checks the value of the passing flag Fp. If the Fp=0 and the passing oncoming vehicle F is not recognized (YES in Step S33), in Step S34, the crosswind estimation control calculator 11a sets a control threshold value Xt with a preceding vehicle based threshold value D (Xt←D). Then, the subroutine goes to Step S36. If Fp=1 and the passing oncoming vehicle F is recognized (NO in Step S33), in Step S35, the crosswind estimation control calculator 11a sets the control threshold value Xt with a passing based threshold value E (Xt←E). Then, the subroutine goes to Step S36. Relationship D>E is established between the preceding vehicle based threshold value D and the passing based threshold value E. Accordingly, when the passing oncoming vehicle F is recognized, the threshold value is decreased to start the control at an earlier timing.

In other words, if the lateral position of the preceding vehicle P is close to that of the oncoming vehicle F when the oncoming vehicle F is passing the preceding vehicle P, vortex occurs between the preceding vehicle P and the oncoming vehicle F. As a result, as illustrated by arrows in FIG. 15, wind pressure, such as suction or extrusion, occurs between the preceding vehicle P and the oncoming vehicle F and the preceding vehicle P is likely to roll due to the influence of the wind pressure. Accordingly, the driver of the preceding vehicle P may dislike the wind pressure and may voluntarily operate the steering wheel toward a direction apart from the oncoming vehicle F when the oncoming vehicle F is passing the preceding vehicle P.

When the driver voluntarily operates the steering wheel, the rolling direction is opposite to the lateral motion direction, as illustrated in FIG. 9A, to cause erroneous determination. In addition, since the time during which the oncoming vehicle F passes the preceding vehicle P is short, reduction in the control threshold value Xt starts the control using the amount of feedforward steering at an earlier timing to suppress the rolling, which occurs when the vehicle M is passing the oncoming vehicle F.

In Step S36 after Step S34 or Step S35, the crosswind estimation control calculator 11a compares the degree-of-influence X with the control threshold value Xt. If X≥Xt (YES in Step S36), the subroutine goes to Step S4 in FIG. 3. If X<Xt (NO in Step S36), the crosswind estimation control calculator 11a determines that the steering control is not to be performed. Then, the subroutine illustrated in FIG. 6 is terminated. At this time, when the oncoming vehicle F that is passing the preceding vehicle P is recognized, the steering control is performed at an earlier timing because the control threshold value Xt is set with the passing based threshold value E, which is lower than the preceding vehicle based threshold value D.

In Step S4 in FIG. 3, the crosswind estimation control calculator 11a determines whether the roll angle φ of the preceding vehicle P and the crosswind duration time exceed the threshold value φo and the threshold time period τo, respectively. If the roll angle φ of the preceding vehicle P and the crosswind duration time exceed the threshold value φo and the threshold time period τo, respectively (YES in Step S4), in Step S5, the crosswind estimation control calculator 11a performs a crosswind handling controlling process for the vehicle M. Then, the routine illustrated in FIG. 3 is terminated. If at least one of the roll angle φ of the preceding vehicle P and the crosswind duration time does not exceed the corresponding threshold value φo or threshold time period τo (NO in Step S4), the routine illustrated in FIG. 3 is terminated.

Figure 7:
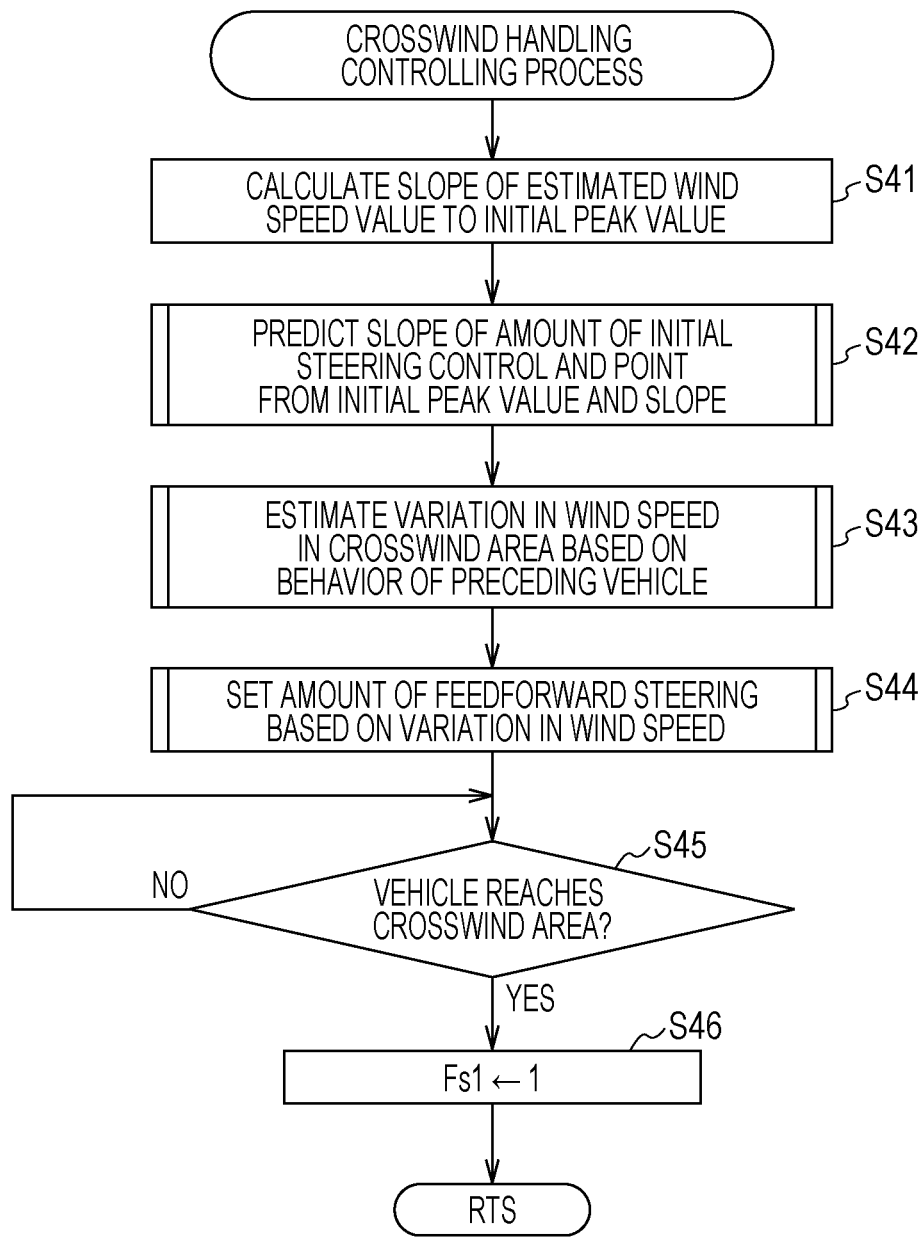
FIG. 7 is a flowchart illustrating a crosswind handling controlling process subroutine.
Figure 11:
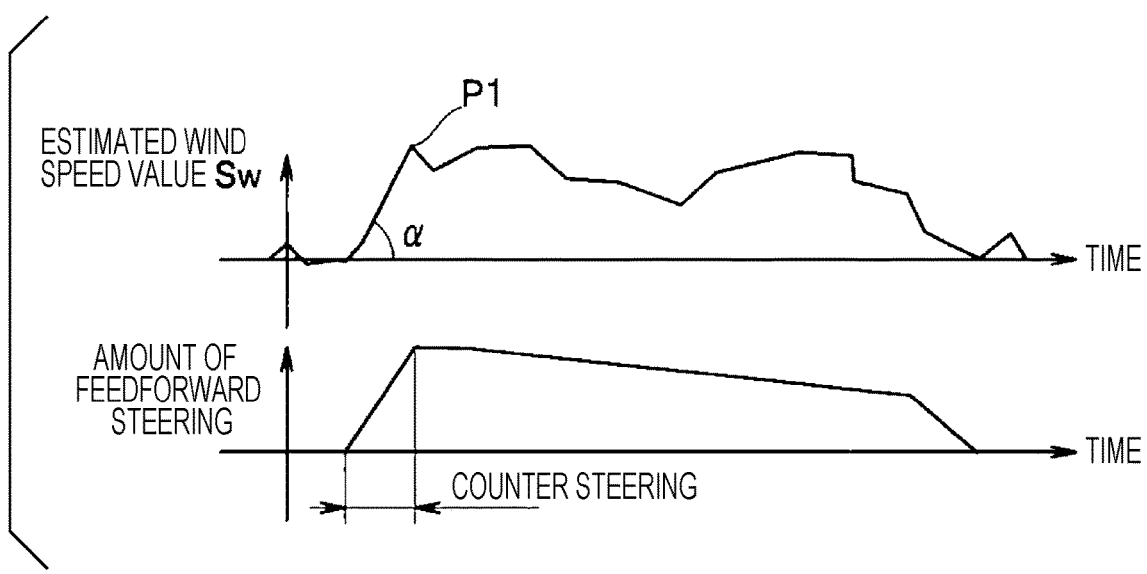
FIG. 11 is a time chart illustrating how an amount of feedforward steering that is set based on the estimated wind speed value is varied.

The crosswind handling controlling process in Step S5 is performed in accordance with a crosswind handling controlling process subroutine illustrated in FIG. 7. Referring to FIG. 7, in Step S41, the crosswind estimation control calculator 11a calculates a slope α based on the time from the rising of the estimated wind speed value Sw, which is set based on the vehicle class and the variation in the behavior of the preceding vehicle P, to an initial peak value P1 (refer to FIG. 11).

In Step S42, the crosswind estimation control calculator 11a predicts a slope of an amount of initial steering control and a point corresponding to the initial peak value P1 from the initial peak value P1 and the slope α. In Step S43, the crosswind estimation control calculator 11a estimates the variation in the estimated wind speed value Sw of the crosswind, which is set every calculation period based on the variation in the behavior of the preceding vehicle P passing the crosswind area. In Step S44, the crosswind estimation control calculator 11a sets the amount of feedforward steering against the estimated wind speed value Sw based on the variation in the estimated wind speed value Sw (refer to FIG. 11).

In Step S45, the crosswind estimation control calculator 11a determines whether the vehicle M reaches the crosswind area. If the vehicle M does not reach the crosswind area (NO in Step S45), the crosswind estimation control calculator 11a is in a standby state until the vehicle M reaches the crosswind area. If the vehicle M reaches the crosswind area (YES in Step S45), in Step S46, the crosswind estimation control calculator 11a sets a crosswind area reaching flag Fs1 (Fs1←1). Then, the subroutine illustrated in FIG. 7 is terminated.

The crosswind area reaching flag Fs1 is read by the ALKB coordination controller 11c in the DSS_ECU 11. An ALKB coordination controlling process in the ALKB coordination controller 11c is performed in accordance with an ALKB coordination controlling process subroutine illustrated in FIG. 8.

Figure 8:
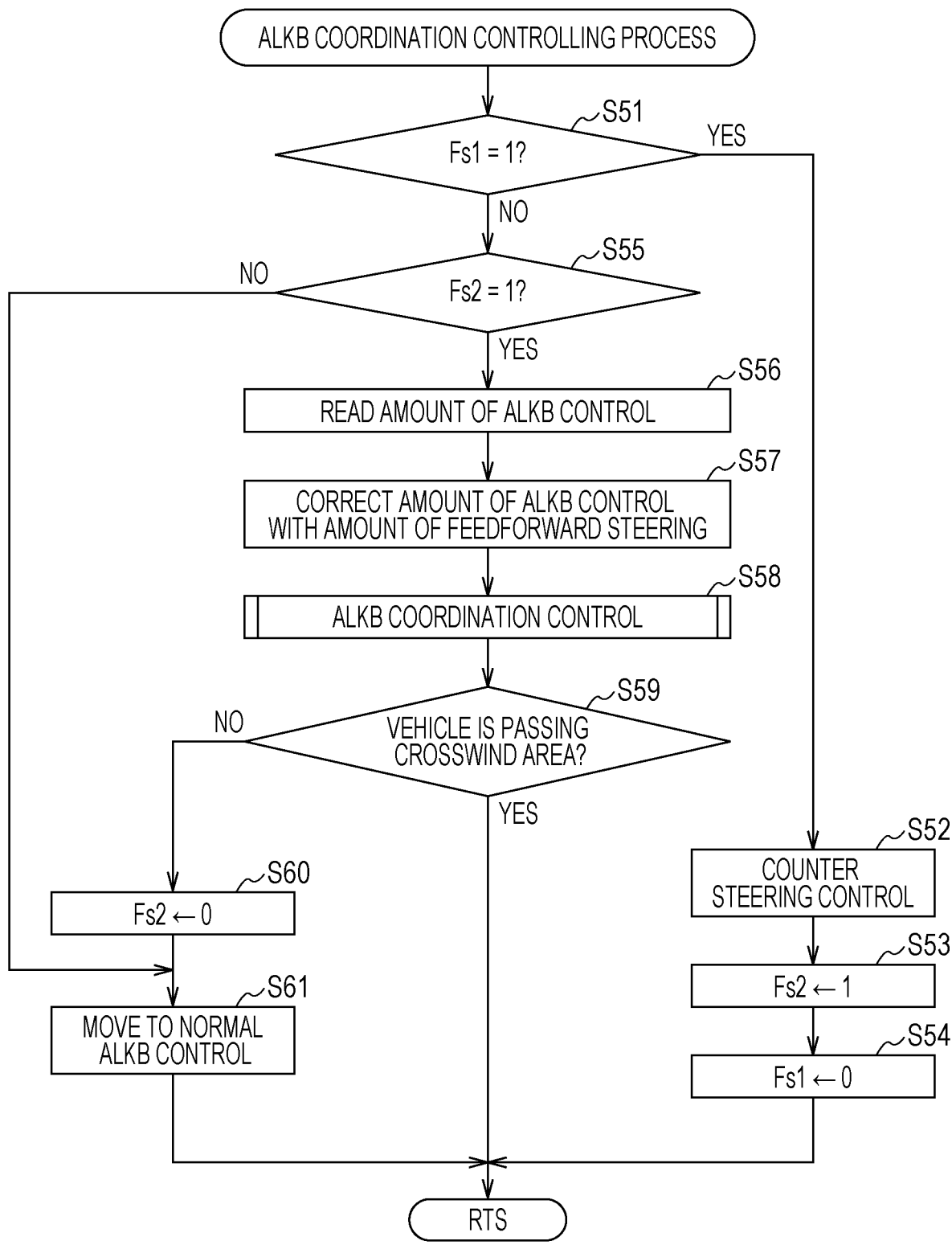
FIG. 8 is a flowchart illustrating an ALKB coordination controlling process subroutine.

Referring to FIG. 8, in Step S51, the ALKB coordination controller 11c refers to the value of the crosswind area reaching flag Fs1. If Fs1=1 and the vehicle M reaches the crosswind area (YES in Step S51), in Step S52, the ALKB coordination controller 11c performs counter steering control (refer to FIG. 12A). Then, the subroutine goes to Step S53. In the counter steering control, the vehicle M is steered in a windward direction of the crosswind to suppress turning round of the vehicle M due to the crosswind when the vehicle M enters the crosswind area. The amount of feedforward steering at this time is set based on the initial peak value P1 and the slope α set in Step S42 in the subroutine illustrated in FIG. 7. This suppresses the rolling when the vehicle M enters the crosswind area to ensure running stability.

In Step S53, the ALKB coordination controller 11c sets a crosswind area passing flag Fs2 (Fs2←1). In Step S54, the ALKB coordination controller 11c clears the crosswind area reaching flag Fs1 (Fs1←0). Then, the subroutine illustrated in FIG. 8 is terminated.

If Fs1=0 and the ALKB coordination controller 11c determines that the vehicle M has reached the crosswind area (NO in Step S51), in Step S55, the ALKB coordination controller 11c refers to the value of the crosswind area passing flag Fs2. If Fs2=1 and the ALKB coordination controller 11c determines that the vehicle M is passing the crosswind area (YES in Step S55), the subroutine goes to Step S56. If Fs2=0 and the ALKB coordination controller 11c determines that the vehicle M has passed the crosswind area (NO in Step S55), the subroutine goes to Step S61.

In Step S56, the ALKB coordination controller 11c reads the amount of ALKB control set by the ALKB control calculator 11b. In Step S57, the ALKB coordination controller 11c corrects the amount of ALKB control with the amount of feedforward steering set in the crosswind estimation control calculator 11a. In Step S58, the ALKB coordination controller 11c performs the ALKB coordination control. Then, the subroutine goes to Step S59.

A steering signal to suppress in advance the rolling and the lateral motion, which are caused by the influence of the crosswind on the vehicle M, is supplied from the ALKB coordination controller 11c to the EPS motor 7. As illustrated by an alternate long and two short dashes line in FIG. 12A, since the amount of ALKB control in the related art is acquired by correcting the difference between the lateral position of the vehicle M and the target path of travel, which is caused by the influence of the crosswind, through the feedback control, control delay occurs. In contrast, since the influence of the crosswind on the vehicle M is predicted based on the vehicle class and the variation in the behavior of the preceding vehicle P and the amount of ALKB control is corrected with the amount of feedforward steering in the present embodiment, the control delay caused when the vehicle M receives the crosswind is suppressed, as illustrated by a solid line in FIG. 12A. Accordingly, the rolling is suppressed to achieve the good running stability.

Figure 12B:
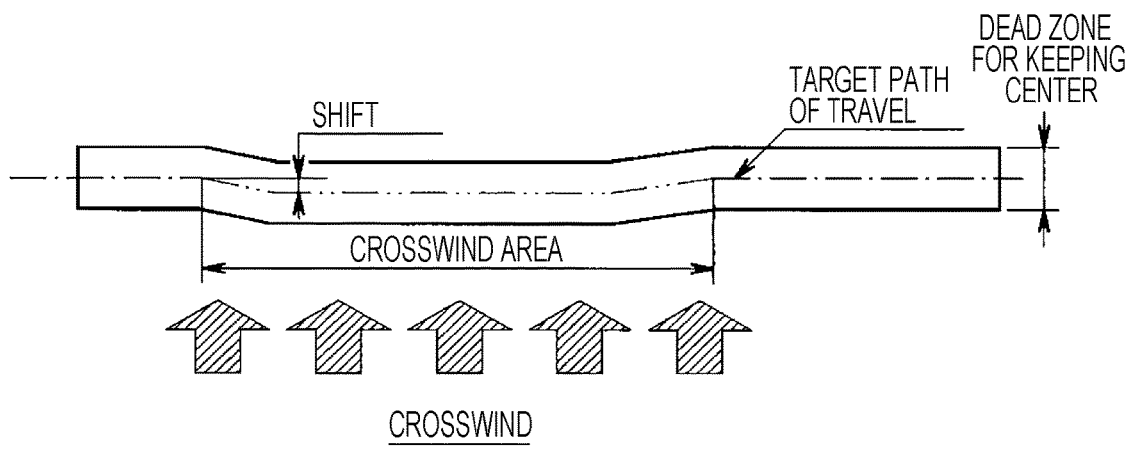
FIG. 12B is a diagram for describing a state in which a target path of travel in a crosswind area is shifted toward the windward direction.

In this case, in the ALKB coordination controller 11c, the target path of travel in the crosswind area may be shifted toward the windward direction, as illustrated in FIG. 12B. This prevents departure of the vehicle M toward the leeward direction when the vehicle M enters the crosswind area to more effectively suppress the rolling of the vehicle body.

In Step S59 after Step S58, the ALKB coordination controller 11c determines whether the vehicle M is passing the crosswind area. The determination of whether the vehicle M is passing the crosswind area is based on the vehicle speed of the preceding vehicle P, the distance from the position where the control is started, which is estimated from the distance between the preceding vehicle P and the vehicle M, to the crosswind area, and the vehicle speed of the vehicle M. If the ALKB coordination controller 11c determines that the vehicle M is passing the crosswind area (YES in Step S59), the subroutine illustrated in FIG. 8 is terminated. If the ALKB coordination controller 11c determines that the vehicle M has passed the crosswind area (NO in Step S59), in Step S60, the ALKB coordination controller 11c clears the crosswind area passing flag Fs2 (Fs2←0). Then, the subroutine goes to Step S61. In Step S61 after Step S55 or Step S60, the ALKB coordination controller 11c moves the control to the normal ALKB control. Then, the subroutine illustrated in FIG. 8 is terminated.

As described above, in the present embodiment, the determination of whether the lateral motion of the preceding vehicle P is caused by the crosswind or a voluntary operation by the driver is based on the rolling direction and the lateral motion direction of the preceding vehicle P. If the preceding vehicle P laterally moves due to the influence of the crosswind, the estimated wind speed value of the crosswind is set and the amount of feedforward steering is set based on the estimated wind speed value of the crosswind. Accordingly, it is possible to effectively suppress the rolling of the vehicle M, which is caused by the crosswind, to achieve high reliability.

The disclosure is not limited to the above embodiments. For example, the front recognition unit 21 may be an ultrasonic sensor, a millimeter-wave radar, a light detection and ranging (LiDAR), or the like, instead of the stereo camera, as long as the unit is capable of recognizing at least the preceding vehicle P and the oncoming vehicle F. Alternatively, the front recognition unit 21 may be composed of a combination of these devices and a monocular camera.

According to the disclosure, since the rolling direction and the lateral motion direction of the preceding vehicle are checked from the variation in the behavior of the preceding vehicle and, if the rolling direction coincides with the lateral motion direction, it is determined that the variation in the behavior is caused by the disturbance. Accordingly, it is possible to set the amount of steering of the vehicle against the variation in the behavior of the preceding vehicle, which is caused by the disturbance, to effectively suppress the rolling of the vehicle when the vehicle receives the disturbance.

The DSS_ECU 11 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the DSS_ECU 11 including the crosswind estimation control calculator 11a, the ALKB control calculator 11b, and the ALKB coordination controller 11c. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle driving support apparatus to be applied to a vehicle, the vehicle driving support apparatus comprising:
   a running environment recognizer configured to recognize running environment in front of the vehicle;
   a preceding vehicle information acquirer configured to acquire information about a preceding vehicle based on the running environment recognized by the running environment recognizer to detect, from the acquired information about the preceding vehicle, a vehicle class of the preceding vehicle and variation in behavior of the preceding vehicle;
   an amount-of-steering control calculator configured to calculate an amount of steering control to cause the vehicle to run along a target path of travel set on a lane;
   a disturbance estimation control calculator configured to estimate, based on the vehicle class and the variation in the behavior, lateral-direction disturbance received by the preceding vehicle to calculate an amount of steering against the disturbance based on the estimated disturbance; and
   a coordination controller configured to correct the amount of steering control calculated by the amount-of-steering control calculator with the amount of steering calculated by the disturbance estimation control calculator to set a new amount of steering control,
   wherein the disturbance estimation control calculator is configured to
   check a rolling direction and a lateral motion direction of the preceding vehicle from the variation in the behavior of the preceding vehicle, and
   in a case where the rolling direction coincides with the lateral motion direction, determine that the variation in the behavior of the preceding vehicle is caused by the disturbance, and calculate the amount of steering.

2. The vehicle driving support apparatus according to claim 1, wherein the disturbance estimation control calculator is configured to estimate, based on the vehicle class and the variation in the behavior, a disturbance area where the disturbance occurs, and calculate the amount of steering in the estimated disturbance area.

3. The vehicle driving support apparatus according to claim 1, wherein the disturbance estimation control calculator is configured to detect a roll angle and an amount of lateral motion of the preceding vehicle based on the variation in the behavior and, in a case where the roll angle of a value higher than or equal to a predetermined threshold value continues for a predetermined threshold time period or more calculate the amount of steering.

4. The vehicle driving support apparatus according to claim 2, wherein the disturbance estimation control calculator is configured to detect a roll angle and an amount of lateral motion of the preceding vehicle based on the variation in the behavior and, in a case where the roll angle of a value higher than or equal to a predetermined threshold value continues for a predetermined threshold time period or more calculate the amount of steering.

5. The vehicle driving support apparatus according to claim 1, wherein the disturbance estimation control calculator is configured to calculate a degree of influence of the estimated disturbance on the vehicle and, in a case where the degree of influence exceeds a predetermined control threshold value, calculates the amount of steering.

6. The vehicle driving support apparatus according to claim 2, wherein the disturbance estimation control calculator is configured to calculate a degree of influence of the estimated disturbance on the vehicle and, in a case where the degree of influence exceeds a predetermined control threshold value, calculates the amount of steering.

7. The vehicle driving support apparatus according to claim 3, wherein the disturbance estimation control calculator is configured to calculate a degree of influence of the estimated disturbance on the vehicle and, in a case where the degree of influence exceeds a predetermined control threshold value, calculates the amount of steering.

8. The vehicle driving support apparatus according to claim 4, wherein the disturbance estimation control calculator is configured to calculate a degree of influence of the estimated disturbance on the vehicle and, in a case where the degree of influence exceeds a predetermined control threshold value, calculates the amount of steering.

9. The vehicle driving support apparatus according to claim 5, wherein the disturbance estimation control calculator is configured to, in a case where an oncoming vehicle that is passing the preceding vehicle is recognized based on the running environment recognized by the running environment recognizer, set the predetermined control threshold value to a value lower than when the oncoming vehicle is not recognized.

10. The vehicle driving support apparatus according to claim 6, wherein the disturbance estimation control calculator is configured to, in a case where an oncoming vehicle that is passing the preceding vehicle is recognized based on the running environment recognized by the running environment recognizer, set the predetermined control threshold value to a value lower than when the oncoming vehicle is not recognized.

11. The vehicle driving support apparatus according to claim 7, wherein the disturbance estimation control calculator is configured to, in a case where an oncoming vehicle that is passing the preceding vehicle is recognized based on the running environment recognized by the running environment recognizer, set the predetermined control threshold value to a value lower than when the oncoming vehicle is not recognized.

12. The vehicle driving support apparatus according to claim 8, wherein the disturbance estimation control calculator is configured to, in a case where an oncoming vehicle that is passing the preceding vehicle is recognized based on the running environment recognized by the running environment recognizer, set the predetermined control threshold value to a value lower than when the oncoming vehicle is not recognized.

13. A vehicle driving support apparatus to be applied to a vehicle, the vehicle driving support apparatus comprising circuitry configured to recognize running environment in front of the vehicle, acquire information about a preceding vehicle based on the recognized running environment to detect, from the acquired information about the preceding vehicle, a vehicle class of the preceding vehicle and variation in behavior of the preceding vehicle, calculate an amount of steering control to cause the vehicle to run along a target path of travel set on a lane, estimate, based on the vehicle class and the variation in the behavior, lateral-direction disturbance received by the preceding vehicle to calculate an amount of steering against the disturbance based on the estimated disturbance; and correct the calculated amount of steering control with the calculated amount of steering to set a new amount of steering control, wherein the circuitry is configured to check a rolling direction and a lateral motion direction of the preceding vehicle from the variation in the behavior of the preceding vehicle, and in a case where the rolling direction coincides with the lateral motion direction, determine that the variation in the behavior of the preceding vehicle is caused by the disturbance, and calculate the amount of steering.

* * * * *